Oct. 10, 1950 — D. H. NELSON — 2,525,147
INTEGRATOR AND TORQUE AMPLIFIER THEREFOR
Filed Aug. 14, 1946 — 2 Sheets-Sheet 1
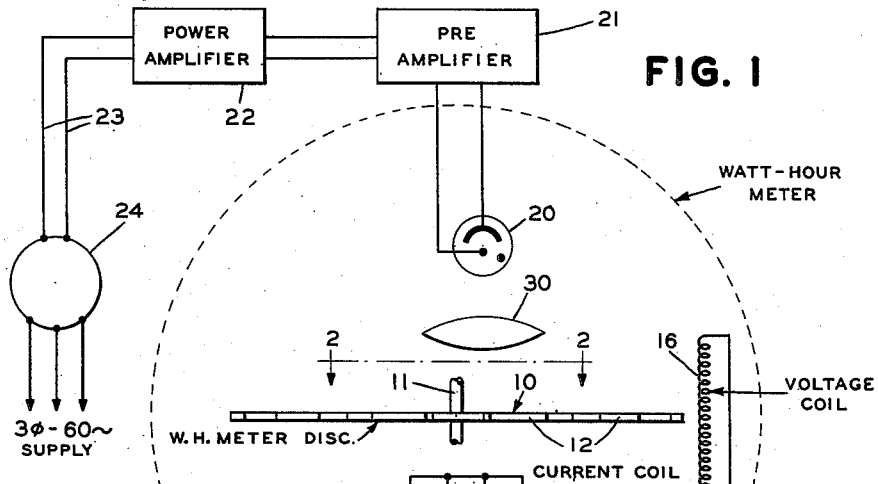
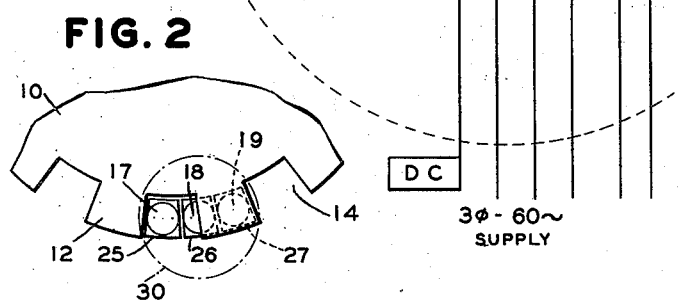
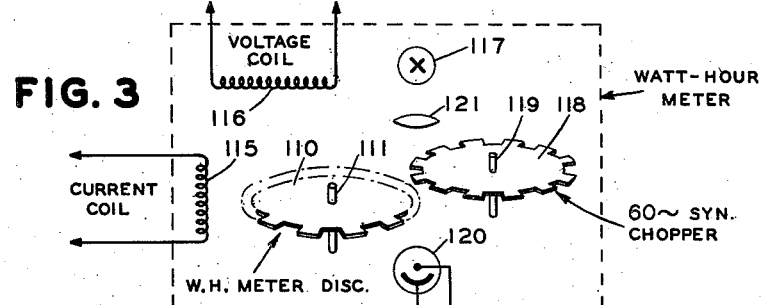
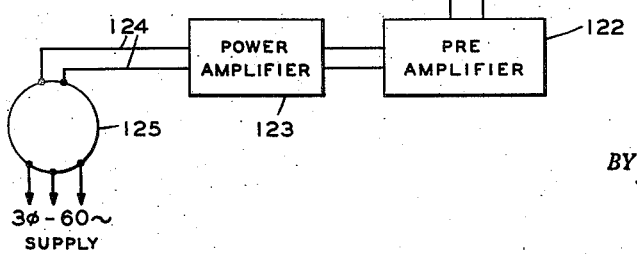
INVENTOR
D. H. NELSON
BY W. C. Middleton
ATTORNEY Oct. 10, 1950  D. H. NELSON  2,525,147
INTEGRATOR AND TORQUE AMPLIFIER THEREFOR
Filed Aug. 14, 1946  2 Sheets-Sheet 2

INVENTOR
D. H. NELSON
BY
W.C. Meddleton
ATTORNEY

Patented Oct. 10, 1950

2,525,147

UNITED STATES PATENT OFFICE 2,525,147

INTEGRATOR AND TORQUE AMPLIFIER THEREFOR

Dale H. Nelson, Southampton, N. Y., assignor to The Western Union Telegraph Company, New York, N. Y., a corporation of New York Application August 14, 1946, Serial No. 690,447

4 Claims. (Cl. 250—233)

This invention relates to improvements in integrators and torque amplifiers therefor, and more particularly to improvements in integrators with respect to time, of quantities expressable by voltage or current, and torque amplifiers therefor.

Watthour meters per se serve as efficient integrators of voltage and current, with respect to time, for some purposes, but due to the lack of mechanical power afforded by such devices, their utility has been limited. It is not possible to use the disk of such a meter as a source of mechanical power with any appreciable load without seriously affecting the accuracy of the device for the normal purposes. The imposition of a train of gears for meter purposes imposes a slight load on a watthour meter disk, but this load does not materially reduce the accuracy to such an extent as to render the meter unsuitable for commercial purposes. However, for precision measurements involving the measurement of a small fraction of one revolution of the disk, such a gear train is wholly inadequate due to the high gear reduction and backlash. A further disadvantage is the still relatively small torque available, even after a considerable gear reduction.

An object of the present invention is to provide an improved integrator of the watthour meter type in which the accuracy is not impaired by the utilization of the disk thereof for mechanical power purposes.

Another object of the invention is to provide an integrator of the foregoing character, in which an extremely large torque amplification of the torque developed by the disk is obtained, without recourse to gear reduction, and without imposing any load on the disk.

Another object of the invention is to provide an integrator of the foregoing character in which no load is placed upon the disk thereof, the integration carried out by the device being indicated otherwise than by means directly mechanically driven by the disk.

Another object of the invention is to provide an integrator of the character before mentioned in which a self-synchronous motor is driven by voltage controlled by a watthour meter disk whereby the self-synchronous motor can be driven in accordance with the rotation of the disk.

Another object of the invention is to provide an integrator in which the watthour meter disk has its periphery formed with alternate teeth and gaps for the purpose of interrupting a light beam or beams traveling to a photoelectric cell, the output of which is amplified and used to excite the rotor of a self-synchronous motor, the stator windings of which are excited by multiphase alternating current.

A further object of the invention is to provide an integrator of the character before described in which a synchronously interrupted light beam can be further interrupted by a watthour meter disk for providing changes of phase of the resultant voltage developed by a photoelectric cell thereby to cause rotation of a self-synchronous motor in accordance with such variations in phase.

A still further object of the invention is to provide an integrator as before described in which the rays of light from sources energized by multiphase alternating current are variously intercepted by a watthour meter disk to cause the generation of voltage, the phase of which varies in accordance with the position of the meter disk, for exciting the rotor of the self-synchronous motor.

In carrying out the foregoing and other objects of the invention, use is made of an induction type watthour meter, the disk of which has its peripheral edge provided with alternate gaps or slots and teeth of corresponding width. In one form of the invention such a disk is associated with a plurality of sources of light rays which are energized respectively by the phases of a source of multi-phase alternating current. In the preferred form of the invention the source of light rays are three in number to be energized by three-phase alternating current. These sources of light rays are so related to the watthour meter disk that a gap or slot in the peripheral edge thereof is of sufficient width as to permit the passage, at any position of the disk, of the equivalent of half of the total flux value of the light rays from all three sources. The rays not intercepted by the watthour meter disk are directed to the photoelectric cell, the output of which is conducted to a suitable pre-amplifier, thence to a suitable power amplifier, and the power amplifier in turn is connected to the rotor winding of a self-synchronous motor, the stator windings of which are connected to the same (i. e. synchronous) three-phase source of alternating current. With this arrangement it follows that as long as the disc is stationary the rotor of the self-synchronous motor will be supplied with current of a constant phase relative to that of the stator windings, with the result that the motor is held stationary. However, when the disk rotates, the phase of the alternating voltage generated by the photoelectric cell varies in accordance with the position of the disk, resulting in either progressively advancing or retarding the phase of the rotor current relative to that of the stator windings of the self-synchronous motor, with a consequent progressive rotation of the rotor of this motor in one direction or the other dependent on the rate and direction of the disk motion. The rotor of the self-synchronous motor thus reproduces the motion of the disk, executing one complete revolution of the rotor for each tooth and gap on the disk.

In another form of the invention, rays of light from a source, energized preferably by direct current, are synchronously interrupted to provide light rays of a frequency corresponding to the frequency of the source of supply used to energize the stator windings of the self-synchronous motor. Again, a watthour meter disk is utilized having its edge provided with alternate teeth and gaps of equal width, which disk is positioned to cause the teeth to lie in the path of part of the rays before mentioned. Again, as long as the disk is stationary, the rays of light synchronously interrupted and impinging upon a photoelectric cell cause the generation of alternating voltage which can be amplified and supplied to the rotor of a self-synchronous motor. When the disk remains stationary, the frequency of the current in the rotor is the same as the synchronous light ray interrupter, and the rotor therefore remains stationary. When the disk moves the changing relationship of the disk teeth either progressively advances or retards the phase of the interrupted light rays, causing the rotor of the self-synchronous motor to progressively rotate either in one direction or the other. In either form of the invention the self-synchronous motor can be utilized to drive any desired mechanisms within the rated power of such motor.

Other features, objects and advantages of the invention will become apparent by reference to the following detailed description of the accompanying drawings illustrating the same, wherein:

Fig. 1 is a schematic circuit diagram including parts of one embodiment of the invention;

Fig. 2 is an enlarged plan view of a fragment of a disk taken substantially on the line 2—2 of Fig. 1;

Fig. 3 is a view similar to Fig. 1 of a modification of the invention; and

Figure 4:
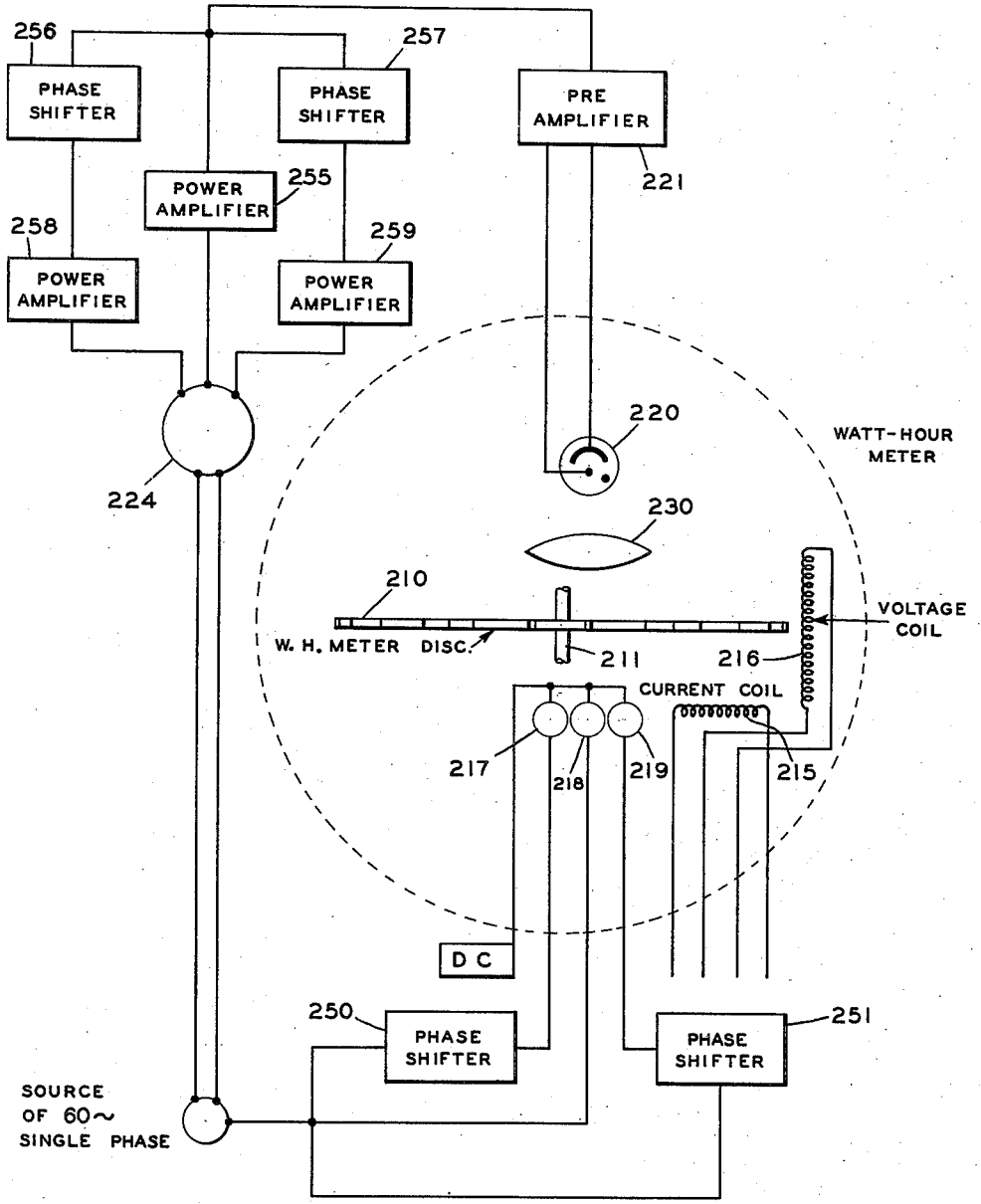
Fig. 4 is a similar view of a further modficaton.

Referring now to the drawings, and particularly to Figs. 1 and 2, 10 indicates generally the disk of a conventional induction type watthour meter, which disk is mounted on a shaft 11 supported by bearings in the usual manner. The peripheral edge of disk 10 is provided with a plurality of teeth 12 separated by gaps or slots 14, which gaps or slots have widths substantially equal to the widths of the teeth 12. The teeth and gaps may be of any desired number, but in the form of the invention herein described both the teeth and gaps are twelve in number respectively. 15 illustrates the current coil, while 16 illustrates the voltage coil either one or both of which may be used to control the rotation of the disk 10. Associated with the disk 10 are three sources of light rays in the nature of small neon bulbs 17, 18 and 19. These bulbs are supplied with current by the three phases of a sixty cycle supply. The bulbs are positioned on an arc corresponding to the arc of curvature of the edge portion of disk 10 having the teeth and gaps or slots therein. Aligned with the bulbs in position to intercept the rays of light directed therefrom is a photocell 20, the output of which is fed to a preamplifier 21 and thence to a power amplifier 22 of any desired types. The amplified output of the amplifier 21 is directed by lines 23 to the rotor winding of a self-synchronous motor 24. The stator windings of this motor are supplied with alternating current by the three phases of a sixty cycle three-phase power source.

Preferably the bulbs 17, 18 and 19 are mounted within three chimneys 25, 26, and 27, respectively, which are of such length and size as to direct the rays of light from these bulbs towards the photocell, in substantially parallel fashion. The chimneys, as shown in Fig. 2, are mounted to conform to the arc of curvature of the disk 10, with each chimney occupying a space approximately equal to two-thirds either of a tooth 12 of a slot 14. Due to this positioning, it follows that with the disk 10 stationary and with the teeth and slots thereof in any position relative to the three chimneys, half of the effective rays from the three bulbs will be unmasked to be directed to the cell 20 through a suitable lens 30, which lens serves to concentrate the rays on the active electrode of the cell. In actual practice the bulbs 17, 18 and 19 are maintained constantly energized by a suitable source of direct current at such a potential that each bulb is in stable operating condition. In addition to this constant energization of the bulbs, each thereof is modulated by its respective phase of alternating current, so that each bulb is cyclically brought to a point of high light emanation alternating with low light emanation maintained above the minimum operating voltage point of the bulb. Thus, so far as the output of the photoelectric cell 20 is concerned for each bulb the current generated thereby is of substantially sine wave character with the median line represented by the condition of the bulb due to the D. C. energization thereof. Lamps 17, 18 and 19 all carry the same 60 cycle frequency modulation of their light flux outputs. However, since their electrical modulations are 120 degrees apart for a three phase system, it follows that the modulation of the light flux outputs will also be 120 degrees apart. Furthermore, it follows that the total modulated voltage from the photoelectric cell 20 will be the vectorial sum of the modulated voltages due to each light flux source.

Considering the disk in the position shown in Fig. 2, it will be seen that at any moment the modulated rays of light passing through the slot overlying bulb 17 and part of bulb 18 will represent the vectorial sum of the full modulated value of bulb 17 plus one-half that of bulb 18, with the output of cell 20 in turn in the nature of a sine wave representing this vectorial sum. With the disk stationary, this output of tube 20 will vary cyclically at sixty cycles so that the power supplied to the rotor of motor 24 by the amplifier 21 will be of sixty cycle character, and will have a temporarily fixed phase relationship to the sixty cycle three-phase alternating current supplied to the stator windings of this motor.

The motor 24, as before mentioned, is a self-synchronous motor, which is of a phase sensitive nature whereby any variation in phase of the excitation of the rotor relative to that of the stator windings will cause a movement of the rotor to bring it into synchronism with the stator windings. If the power supplied to the rotor is of the same frequency as that supplied to the stator windings, the rotor and consequently the driving shaft of the motor will remain stationary.

However, if the phase of the current exciting the rotor is advanced or retarded any number of degrees electrically, the rotor will rotate either in one direction or the other, depending on the direction of phase change, a corresponding number of angular degrees. Consequently, if the phase relation of the rotor exciting current is shifted through 360 electrical degrees per second in an additive direction, the result will be that the rotor of the motor will rotate one revolution per second. Similarly, if the phase change is in the subtractive direction the rotor will rotate in the opposite direction one rotation per second.

Due to this character of the self-synchronous motor, it follows that should the disk 10 be rotated under the impetus provided by the windings 15 and 16, such rotation will either advance or retard the phase relation of the voltage developed by cell 20 from the lamps 17, 18 and 19 in accordance with the position of the disk. Rotation of this disk in one direction will advance this phase relation, while rotation in the opposite direction will retard the same. Should the disk be rotated in one direction (Fig. 2) through an arc encompassing one tooth 12 and one slot 14, the effect will be to advance the phase of the output of cell 20 through 360 electrical degrees, causing the rotor of motor 24 to rotate through 360° or one complete revolution thereof.

With the disk 10 being provided with twelve teeth and twelve slots, it will be apparent that one revolution per second of this disc will cause twelve revolutions per second of the rotor of motor 24, and further that any change of position of disk 10 will be immediately reflected by a change of position of this motor. Furthermore, any reversal of direction of rotation of the disk results in a corresponding reversal of direction of rotation of the motor. The shaft of the motor, therefore, can be connected in any suitable manner to any mechanism which it may be desirable to be driven, such as an indicating device or any other mechanism, control of which should be in accordance with the integration with respect to time, of quantities expressible by voltage or current.

In the embodiment of the invention shown in Fig. 3, 110 illustrates a watthour meter disk similar to that shown at 10 in Fig. 1, such disk being rotatably mounted on a shaft 111 to be driven by coils 115 and 116. Instead, however, of utilizing three sources of light rays as in the previous embodiment, use is made of a single source of light rays 117 in the nature of a light bulb to be energized by direct current.

Interposed between the bulb 117 and the disk 110 is a light chopper in the nature of a disk 118, the periphery of which is provided with teeth and slots similar to those of the disk 110. Disk 118, which is mounted on a shaft 119, is driven by a suitable motor (not shown) at such rate as to cause the rays of light from source 117 to be interrupted synchronously at a rate corresponding to the frequency of the alternating current used in a manner to be described later. In the arrangement shown, the disc 118 is provided with twelve teeth and twelve slots, so that if this disk is rotated at the rate of five revolutions per second, the beam of light rays will be interrupted sixty times per second, or in synchronism with a sixty cycle supply source. Use is also made of a photocell 120 in line to receive rays of light from source 117, with a lens 121 interposed for the purpose of insuring parallelism of the rays. The output of cell 120 is fed to a pre-amplifier 122 and thence to a power amplifier 123 which in turn is connected by lines 124 to the rotor of a self-synchronous motor 125, the stator windings of which are energized by the three phases of a suitable three-phase power supply source.

The teeth and slots of disk 110 (twelve in number respectively) are of such width relative to the photocell 120, that one tooth and one slot combine to present an area representing the effective range of the photocell. Consequently, should the disk 110 be at rest while the synchronous chopper comprising disk 118 is rotating at its constant synchronous speed of rotation, the result will be the imposition on the photocell 120 of light rays of cyclically varying intensity, the variation being carried out at the rate of sixty cycles per second. Due to such light rays, the photocell generates voltage, amplified by pre-amplifier 122 and power amplifier 123, which is in the nature of alternating current and is supplied to the rotor winding of the motor 125. This motor is similar to that previously described and, as before, so long as the phase of the current through the rotor is temporarily fixed with respect to that through the stator windings, the rotor remains stationary. Should the disk 110, however, be moved under the control of the coils 115 and 116, the phase relation of the generated alternating voltage (by photocell 120) is either progressively advanced or retarded relative to the stator supply source, with the result that the motor is also progressively rotated either in one direction or the other. For example, if the chopper disk is rotating in a counterclockwise direction and the disk 110 is moved in a clockwise direction, the result would be to retard the phase of the rotor current in proportion to the motion of disk 110. For further example, if the disk 110 is rotated at such speed that one tooth and one slot cross the path of light rays in one second, the synchronous motor will be rotated through one revolution each second, and since under the prescribed conditions the phase relation is of a retarded nature the motor will be rotated in one direction. Should, however, the disk 110 be moved also in a counterclockwise direction, the effect would be to advance the phase relation of the rotor current, causing the motor 125 to be moved in the opposite direction. Again, as before described, the motor 125 can be connected to any suitable mechanism, either for indicating purposes or for obtaining automatic actuation of such mechanism as may be desirable, particularly control mechanism wherein it is desired that the operation thereof be governed by integration, with respect to time, of quantities expressible by voltage or current.

In the modification of the invention shown in Fig. 4, 210 illustrates a watthour meter disk similar to those before described, such disk being rotatably mounted on shaft 211 to be driven by coils 215 and 216. Three bulbs 217, 218 and 219, similar to those described in connection with Fig. 1, are mounted in substantially the same relation as in that figure. The bulbs 217, 218 and 219 are energized from a suitable source of 60 cycle, single phase current with any one bulb, such as bulb 218, being energized directly thereby. Bulb 217 and bulb 219, however, have interposed in the energizing circuit of each phase shifters 250 and 251, respectively. These phase shifters are constructed in conventional fashion and are so related to the source of power that the phase of the current energizing the respective lamp can be shifted relative to the reference phase so that, for example, lamp 219 is energized by current advanced 120° relative to the current energizing 218, while that energizing lamp 217 is either advanced 240° or retarded 120°. The overall effect is similar to that described in connection with Fig. 1.

Aligned with the bulb in position to intercept the rays of light therefrom is a photocell 220, the output of which is fed to a pre-amplifier 221 and thence through phase shifters and power amplifiers and through a single power amplifier to the stator windings of a synchronous motor 224. As shown in the drawings one winding of this motor is energized directly from the pre-amplifier through a power amplifier 255 while phase shifters 256 and 257 are interposed between pre-amplifier 221 and the power amplifiers 258 and 259 which are connected to the other two windings of the motor 224. These phase shifters 256 and 257 are provided for the same purposes as the phase shifters 250 and 251 so that with the shifter 256 being constructed to advance the voltage output of pre-amplifier 251 120° and phase shifter 257 being constructed either to advance these voltages 240° or retard the same 120° the final result will be that the three windings of the stator of motor 224 will have impressed thereon voltages of 3-phase character with 120° interval the phases thereof.

In this modification, the operation is substantially the same as that previously described in that voltages are developed by the photoelectric cell 220 in accordance with the intensity of the light flux directed to this photoelectric cell through condensing lens 230. The phase of the voltages generated by cell 220 will vary in accordance with movement of the disk 210 which has teeth therein exactly as described in disk 10. However, instead of utilizing the single phase voltages of varying character to energize the rotor of a self-synchronous motor such voltages are amplified and branches thereof shifted uniformly so that the stator windings of such a motor can be energized by 3-phase voltages while the rotor is energized by a fixed single-phase 60 cycle source. Motors of this character can be operated equally well by varying the phase relation of the stator windings instead of varying the phase relation of the rotor winding. This arrangement makes possible operation of the invention in installations wherein only single phase alternating current is available.

From the foregoing will be seen that the present invention in any of the forms illustrated and described provides novel arrangements whereby the torque of a member can be amplified without imposing a load on such member.

What is claimed is:

1. The method of amplifying the torque of a movable member which comprises energizing a plurality of sources of light rays each with energy of a different phase relative to that of the other sources, directing light flux from said sources upon a light sensitive element to cause said element to generate alternating voltages, modulating the light flux from said sources in accordance with movement of said member to cause said element to vary the phase of said alternating voltages, and impressing said voltages upon a phase sensitive device to control actuation thereof.

2. Apparatus of the character described comprising a plurality of sources of light flux, a light sensitive device in the path of said light flux, a movable member having parts thereof in said path of light flux, means for energizing said sources with multi-phase energy to vary the intensity of said light flux thereby to cause said device to generate alternating voltages, movement of said member modulating said light flux to cause said device to vary the phase of said voltages, and a phase sensitive device actuated by said voltages.

3. Apparatus of the character described comprising a plurality of sources of light flux energized by multi-phase energy, a light sensitive device in the path of said light flux, a movable member having parts thereof in said path of light flux intercepting part of said flux to cause said device to generate alternating voltages, movement of said member modualting said light flux to cause said device to vary the phase of said voltages, and a phase sensitive device actuated by said voltages.

4. Apparatus of the character described comprising a plurality of sources of light flux constantly energized to a predetermined degree, a light sensitive device in the path of said light flux, a movable member having parts thereof in said path of light flux, means for energizing said sources with multi-phase energy to vary the intensity of said light flux thereby to cause said device to generate alternating voltages, movement of said member modulating said light flux to cause said device to vary the phase of said voltages, and a phase sensitive device actuated by said voltages.

DALE H. NELSON.

REFERENCES CITED

The following references are of record in the file of this patent:

UNITED STATES PATENTS

| Number | Name | Date |
|---|---|---|
| 1,912,139 | Hough | May 30, 1933 |
| 1,916,356 | Bohner | July 4, 1933 |
| 2,065,421 | Bernarde | Dec. 22, 1936 |
| 2,167,484 | Berry | July 25, 1939 |
| 2,411,147 | Cooley | Nov. 19, 1946 |
| 2,451,971 | Oman | Oct. 19, 1948 |

FOREIGN PATENTS

| Number | Country | Date |
|---|---|---|
| 46,165 | France | Dec. 23, 1935 |